United States Patent [19]

Hoshizaki

[11] Patent Number: 5,628,676
[45] Date of Patent: May 13, 1997

[54] COUNTER-BALANCE FOR DISK TEXTURIZING APPARATUS

[75] Inventor: Jon A. Hoshizaki, Cupertino, Calif.

[73] Assignee: Exclusive Design Company, Fremont, Calif.

[21] Appl. No.: 397,622

[22] Filed: Mar. 2, 1995

[51] Int. Cl.⁶ .................................................. B24B 7/00
[52] U.S. Cl. ............................................. 451/168; 451/343
[58] Field of Search .................................... 451/343, 306, 451/307, 168, 221, 269, 63; 74/55

[56] References Cited

U.S. PATENT DOCUMENTS

| | | | |
|---|---|---|---|
| 4,145,846 | 3/1979 | Howland et al. | 451/306 |
| 4,347,689 | 9/1982 | Hammond | 451/307 |
| 4,635,405 | 1/1987 | Stump | 451/307 |
| 4,656,790 | 4/1987 | Mukai et al. | 451/307 |
| 4,930,259 | 6/1990 | Kobylenski et al. | 451/307 |
| 5,018,311 | 5/1991 | Malagrino, Jr. et al. | 451/307 |
| 5,099,615 | 3/1992 | Ruble et al. | 451/63 |

FOREIGN PATENT DOCUMENTS 1301038  5/1989  Japan .

Primary Examiner—James G. Smith
Assistant Examiner—Derris H. Banks
Attorney, Agent, or Firm—Pennie & Edmonds

[57] ABSTRACT

An apparatus and method is disclosed for texturizing magnetic storage disks in which the vibration due to forces imparted by oscillating motion is greatly decreased. Typically, the oscillating motion is caused by an oscillating spindle assembly which is slidably mounted on a base. The disclosed apparatus and method utilizes a counter-balance slidably mounted to the base which is caused to move in an opposite direction to the oscillating assembly. The apparatus uses a mechanical linkage which includes a yoke attached to the oscillating assembly, and a pulley and cable arrangement, attached to the counter-balance.

7 Claims, 5 Drawing Sheets

COUNTER-BALANCE FOR DISK TEXTURIZING APPARATUS

BACKGROUND OF THE INVENTION

1. Technical Field

The present invention relates to texturizing and polishing disks. More specifically, the present invention relates to an apparatus and method for texturizing disks of the type used for magnetic storage of information.

2. Discussion of the Related Art

During operation, magnetic storage disks spin at high speeds while a read/write head floats on a cushion of air near the surface of the disk. When not in use, the read/write head typically "parks" in a special zone of the disk, usually near the inside edge. The disk surface is texturized in order to prevent the head from sticking onto the surface of the disk when parked. The texture on the disk consists of many small grooves, typically on the order of 40 angstroms from peak to valley.

Texturization of magnetic storage disks is generally accomplished by rotating the disk while bringing to bear upon each side of the disk an abrasive medium supported by a compliant "load roller". The position of the roller and medium relative to the disk is made to vary toward and away from center of the disk in an oscillatory manner. Texture grooves are formed by the abrasive particles creating non-circular patterns on the disk. It is important that the pattern of the texture grooves on the disk have certain characteristics, such as a specific intensity as well as a specific angle with respect to a concentric circle on the disk.

The oscillating motion between the disk and the abrasive medium can be accomplished in a number of ways. In one method, the abrasive media is held stationary while the rotating disk is translationally oscillated across the abrasive media. The disk is clamped in a spindle assembly which rotates the disk, while the entire spindle assembly and rotation means is mounted on a sliding base. Typically a cam and follower arrangement act to oscillate the base, spindle assembly and disk. An example of a cam-based method is the Model 1800A Automated Surface Finisher made by Exclusive Design Company, the assignee of this application. In another arrangement, the center of the rotating disk is held stationary while the abrasive media, rollers and magazine assembly are translationally oscillated in horizontal directions parallel to the plane of the disk with a stepper motor and lead screw. An example of this method is the Model 1800 Automated Surface Finisher made by Exclusive Design Company.

In both of these methods of texturization, the oscillating motion requires that a substantial amount of mass be continuously accelerated and decelerated. The accelerations, which are transmitted to the frame of the apparatus cause undesirable vibration. The vibration may be severe enough to effect various element on the texturizing machine. For example, the load rollers may begin to vibrate resulting in chatter or undesired patterns on the disk.

Increasingly, disk texturizing processes are requiring higher frequency oscillations in order to increase throughput. Processes are also increasingly requiring that the position and velocity of the oscillator be more precisely controlled. Both higher oscillation frequencies and more precise positioning result in greater accelerations and therefore impart an increased amount of force on the system.

Moreover, texturizing patterns are increasingly required to be "triangular" rather and sinusoidal, meaning that the grooves on the disk consist primarily of straight lines rather than rounded sinusoidal sections. Triangular texturizing patterns result in more consistent "crossing angles" which are defined as the angles between the grooves and the path of a read/write head. In order to texturize a disk with a highly triangular texturizing pattern, higher accelerations and decelerations are generally necessary since the oscillator must reverse directions more quickly.

Thus, with increasing amounts of acceleration being exerted on the frame of the texturizing machine, problems such as load roll chatter and vibration which effect the resulting texture pattern on the disk are increasing as well. Therefore, there is an increased need to alleviate the magnitude of the overall force transmitted to the frame of the system due to the accelerations.

SUMMARY OF THE INVENTION

Thus it is an object of the present invention to provide an apparatus for decreasing the magnitude of the force transmitted to the frame of a disk texturizing apparatus during processing.

In order to meet this objective, the present invention is directed to an apparatus and method for texturizing a disk having an oscillating spindle assembly which is linked mechanically to a counter-balance having a mass which is substantially equal to that of the spindle assembly. The mechanical linkage preferably consists of a yoke which is fastened to the spindle assembly, as well as a pulley and cable arrangement which connect the yoke to the counter-balance. In response to a translational movement in the spindle assembly, the mechanical linkage imparts an equal and opposite force on the counter-balance, causing the counter-balance to translationally move in the opposite direction.

The force exerted on the frame of the system by the acceleration of the spindle mass is thereby substantially offset by an equal and opposite force exerted by the counter-balance.

DETAILED DESCRIPTION OF THE INVENTION

Figure 1:
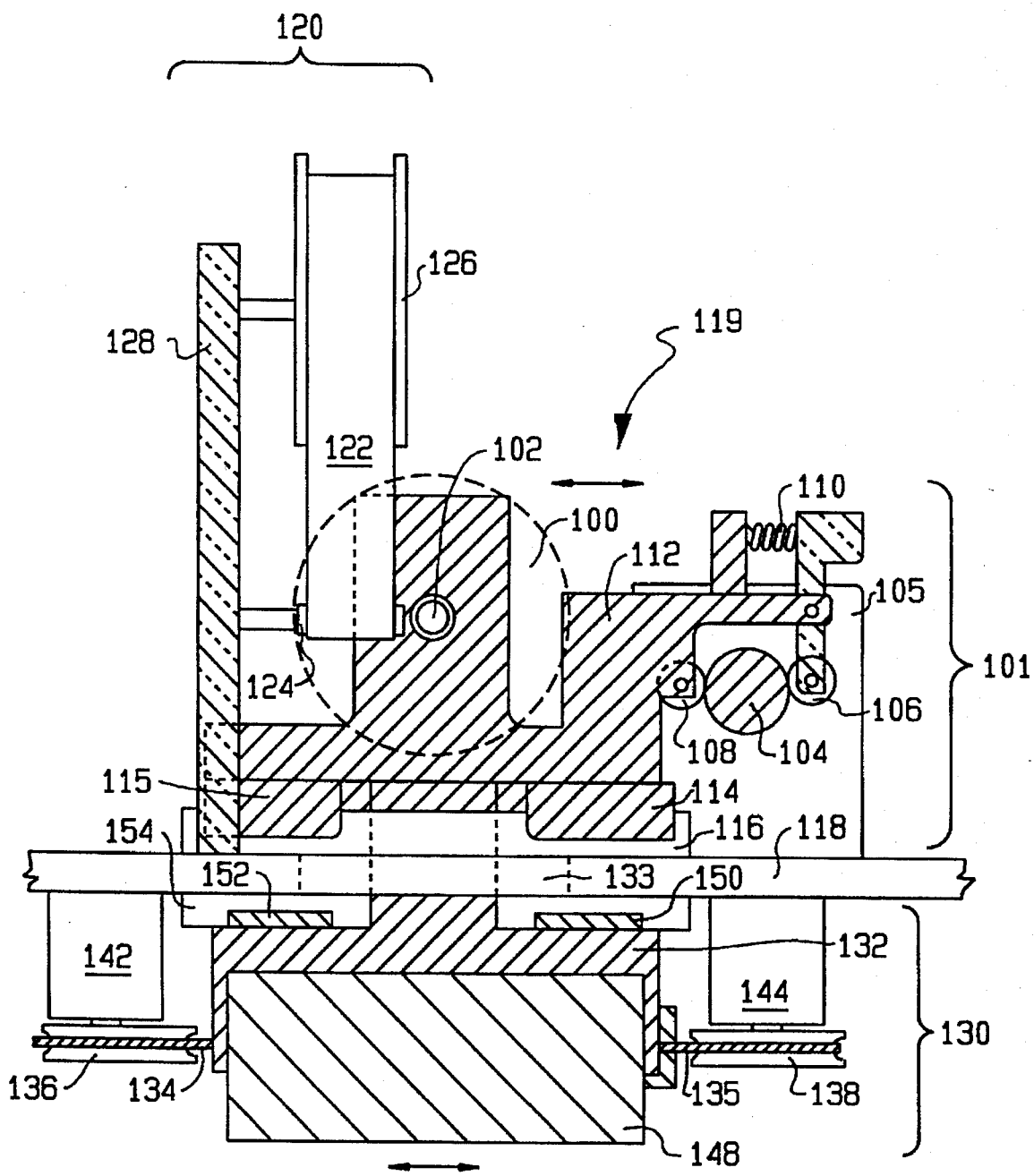
FIG. 1 is a frontal view of a disk texturizing apparatus according to the present invention.

The following embodiments of the present invention will be described in the context of a method and apparatus for texturizing magnetic storage disks, although those skilled in the art will recognize that the disclosed methods and structures are readily adaptable for broader application. For example, the invention is readily adaptable for use in processing other types of disks and wafers. Note that whenever the same reference numeral is repeated with respect to different figures, it refers to the corresponding structure in each such figure.

Figure 2:
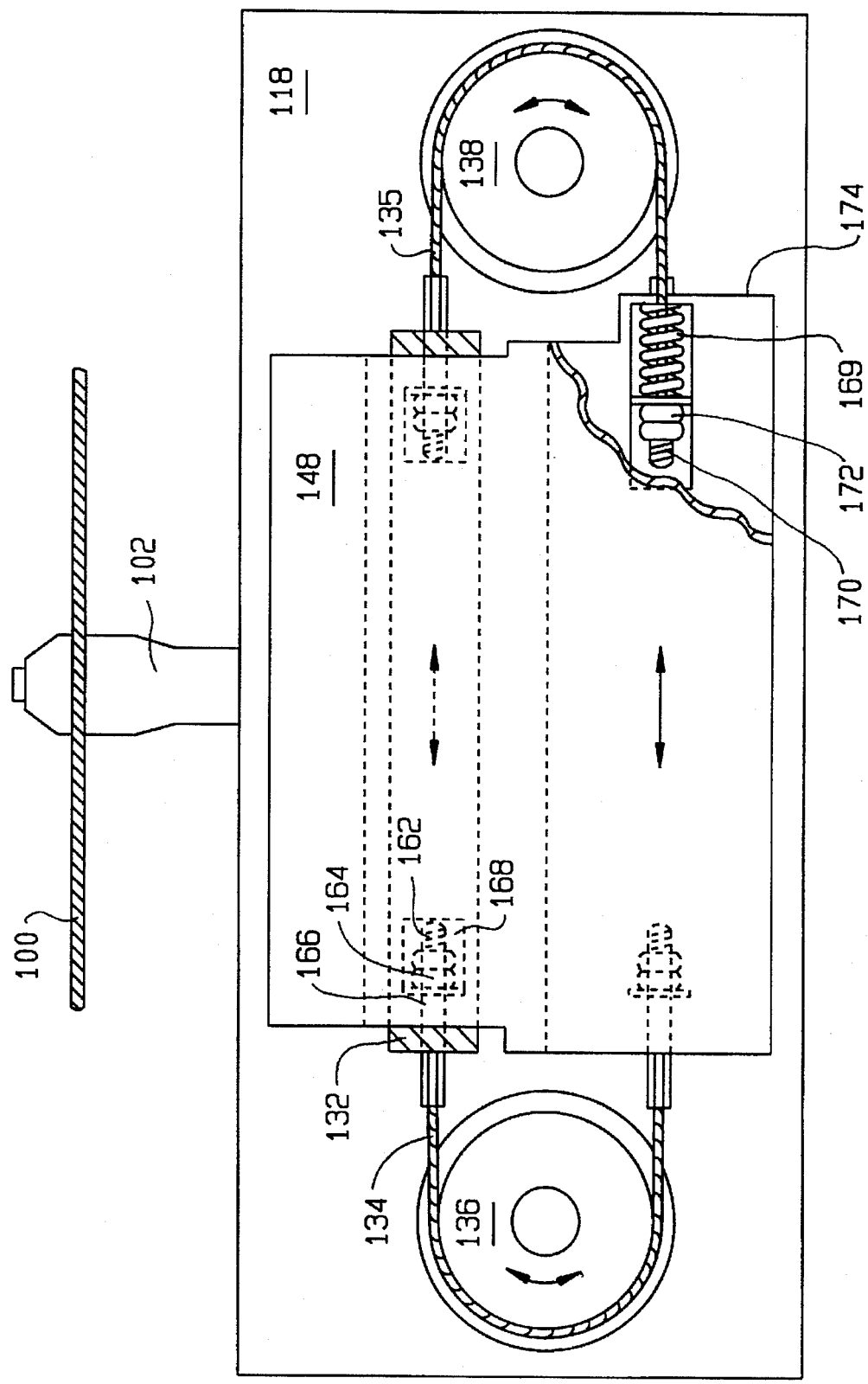
FIG. 2 is bottom view of a disk texturizing apparatus according to the present invention.
Figure 3:
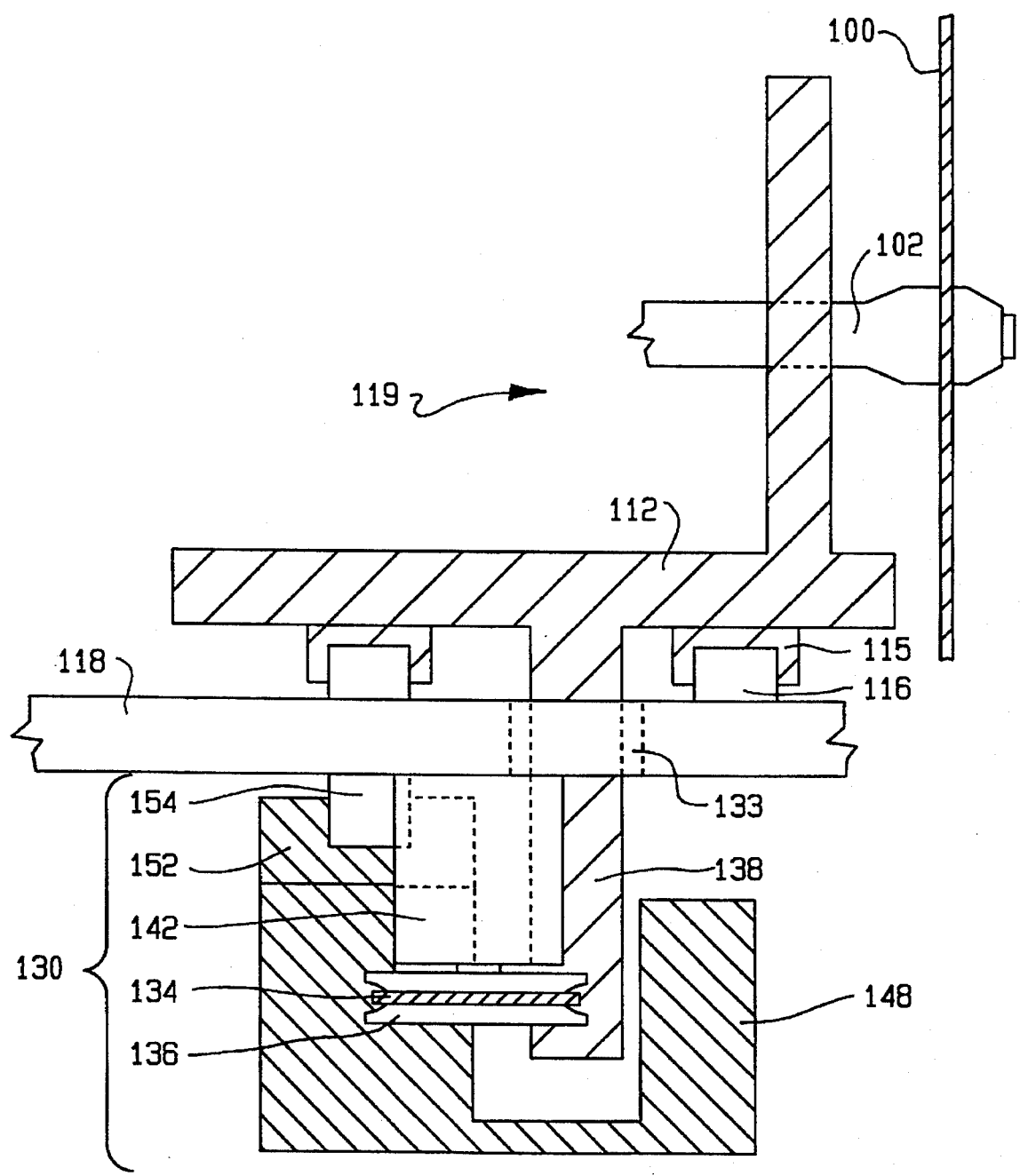
FIG. 3 is a side view of a disk texturizing apparatus according to the present invention.

A disk texturizing apparatus and method according to the present invention is illustrated in FIG. 1, which shows a disk 100 is being texturized by the apparatus. The apparatus in FIG. 1 can be understood as comprising three major assemblies: spindle and oscillator system 101 which rotates and oscillates the disk, abrasive media system 120 which applies abrasive media to the disk surfaces, and counter-balance system 130 for reducing the overall amount of force transmitted to the frame of the apparatus during texturizing. It should be noted that the present invention is illustrated by way of example in FIGS. 1-3 as used with the Exclusive Design Company Model 1800A Automated Surface Finisher. Based on the teaching set forth herein, a person of ordinary skill may readily utilize the present invention with any suitable disk texturizer employing an oscillation between the disk spindle and abrasive media system. This includes systems such as shown in FIGS. 1-3 wherein the oscillation is provided by movement of the disk spindle, as well as systems such as the previously described Exclusive Design Company Model 1800 wherein the oscillation is provided by movement of the abrasive media system, schematically illustrated in FIG. 4. In a further preferred alternative embodiment, the texturizing apparatus employs the spindle oscillating system as disclosed in application Ser. No. 08/397,621, filed concurrently herewith, entitled "Method and Apparatus for Disk Texturizing" by Roger O. Williams, et al., also assigned to the Exclusive Design Company. This co-pending application and the spindle oscillating and rotating system described therein is incorporated herein by reference thereto.

As shown in FIG. 1, spindle and oscillator system 101 comprises spindle subassembly 102 which includes a collet for clamping disk 100 by the inner edge of disk 100. Spindle subassembly 102 is rotated by a transmission belt and servomotor (not shown), which ultimately rotates disk 100. Spindle subassembly 102 as well as the servomotor are fixedly mounted on spindle base 112. In this embodiment, spindle base 112 is oscillated by a cam and follower arrangement. Cam 104 is rotated by cam rotator 105 which typically includes a transmission belt and servomotor. As cam 104 rotates, cam followers 106 and 108 are held to the surface of cam 104 by cam follower spring 110. As cam followers 108 and 106 follow cam 104, an oscillatory motion is imparted on spindle base 112. Spindle base 112 is slidably mounted on frame 118 by way of linear bearings 114 and 115 which slide on bearing guide 116.

Thus, as cam 104 rotates, oscillating the entire mass of spindle assembly 119 translationally oscillates relative to the frame 118 in a horizontal direction as shown in FIG. 1 at arrow A. The oscillating spindle mass includes spindle base 112, cam followers 106 and 108, cam follower spring 110, spindle assembly 102, as well as various elements understood by persons of ordinary skill which are not shown for the purpose of clarity, such as the transmission belt and servomotor to rotate spindle subassembly 102 and various control elements for precise positioning and rotation.

As shown in FIG. 1, the abrasive media system 120 comprises abrasive tape 122, which is applied to both front and back surfaces of disk 100 by two load rollers 124, one being on each side (only the front side is visible in FIG. 1). Tape magazines 126 serve to supply and take-up abrasive tape 122 during texturization. Tape magazines 126 and load rollers 124 are supported by and mounted to magazine frame 128, which is typically stationary during texturization but movable for positioning prior to and after texturization.

Counter-balance system 130 is shown in FIG. 1 according a preferred embodiment of the invention. Yoke 132, which transmits the relative horizontal motion of the oscillating spindle assembly 119 to the rest of counter-balance system 130, is fixedly attached to spindle base 112 and passes through a notched hole 133 in frame 118. The lower portion of yoke 132, as shown in FIG. 1, is substantially wider than the upper portion. The lower portion of yoke 132 is attached to two cables 134 and 135, by an arrangement of threaded studs and nuts. Cables 134 and 135 are seated in notched pulleys 136 and 138 respectively, and are attached to the rear portion of counter-balance 148. Pulleys 136 and 138 are attached to hub assemblies 142 and 144 which are both mounted on the underside of frame 118 as shown in FIG. 1. Counter-balance 148 preferably is a U-shaped mass comprising a front section and a rear section which are oriented in front of and to the rear of the lower portion of yoke 132. The rear portion of counter-balance 148 is slidably attached to frame 118 by linear bearings 150 and 152 and linear guide 154, such that counter-balance 148 translates in horizontal directions.

According to a preferred embodiment of the invention, the mass of counter-balance 148 is substantially equal to the total mass of the entire oscillating spindle assembly 119, including yoke 132. Thus, any acceleration forces from the oscillating spindle assembly in horizontal directions may be effectively offset by equal and opposite acceleration forces from the counter-balance.

Referring now to FIG. 2, the cable and pulley arrangement of counter-balance system 130 may be better understood. Note that cable 134 is attached to yoke 132 by threaded stud 162, nuts 164 and washer 166. Washer 166 is seated in a cup 168 in yoke 132. Cable 135 is attached to yoke 132 and cable 134 is attached to counter-balance 148 in a similar fashion. However, cable 135 is attached to counter-balance 148 using preload spring 169, which allows slight variations in the overall length of cables 134, 135 and yoke 132, while maintaining tension in the cables. As shown in FIG. 2 in the cut away portion of counter-balance 148, threaded stud 170 is crimped on cable 135 and is fixed to nuts 172. Nuts 172 seat on a washer which is seated on preload spring 168, which is seated in cup 174 in counter-balance 148.

The spring value of preload spring 169 should be larger than any accelerating force that counter-balance 148 may experience. If this is not true, then the spring preload can be overcome, possibly resulting in a lack of synchronization between the motion of the oscillating spindle assembly 119 and counter-balance 148.

Thus the oscillating spindle assembly 119 and counter-balance 148 are effectively coupled by cables 134 and 135, and yoke 132, such that any horizontal motion by the oscillating spindle assembly is offset by an equal and opposite horizontal motion of counter-balance 148.

Note that although the described embodiment uses cables and pulleys for linkage, the invention is intended to cover other linkage means as well, for example, one of ordinary skill will recognize that using a metal belt and pulley, a chain and cogs or other mechanical linkages require only minor modifications to the preferred embodiment. One such alternative embodiment is described below and is shown in FIG. 5.

Referring now to FIG. 3, the orientation of counter-balance 148 and yoke 132 according to the preferred embodiment may be better understood. Counter-balance 148 comprises a U-shaped mass which surrounds yoke 132, such that the mass of counter-balance 148 is centered closer to the center of mass of oscillating spindle assembly 119, thereby reducing the amount of torque transmitted to the frame 118. Note in FIG. 3 that various structures that typically make up oscillating spindle assembly 119, such as a spindle servomotor, belts, monitoring means, and a collet expansion actuator, are omitted for the purpose of clarity. As shown in FIG. 3, the front portion of counter-balance 148 protrudes in front of yoke 132, while the rear portion is situated to the rear of yoke 132. The front and rear portions are rigidly held together with a thick plate. Linear bearings 150 and 152 slide on linear guide 154, and ensure that counter-balance 148 moves in a line parallel to the translational movement of spindle base 112.

Figure 4:
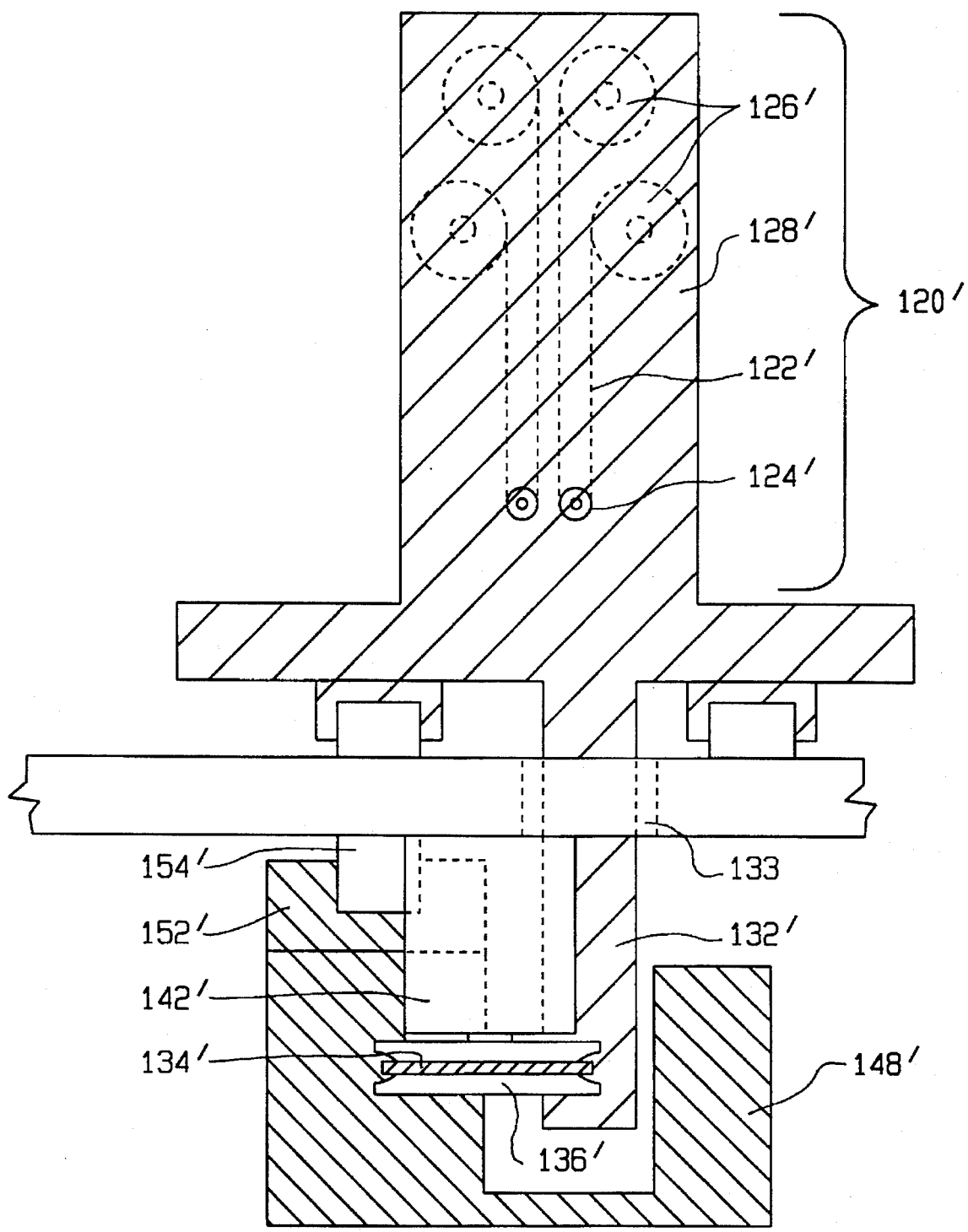
FIG. 4 is a schematic side view of an alternative embodiment of the invention wherein oscillation is provided by the abrasive media system.

FIG. 4 illustrates an alternative embodiment wherein oscillation is provided by movement of the abrasive media system. In this case, counter-balance 148' is secured by yoke 132' to magazine frame 128'. In general, the design of this alternative embodiment is otherwise as described above. Appropriate modifications, such as sizing the counter-balance to match the moving mass of the abrasive media system, will be apparent to persons of ordinary skill in the art.

Figure 5:
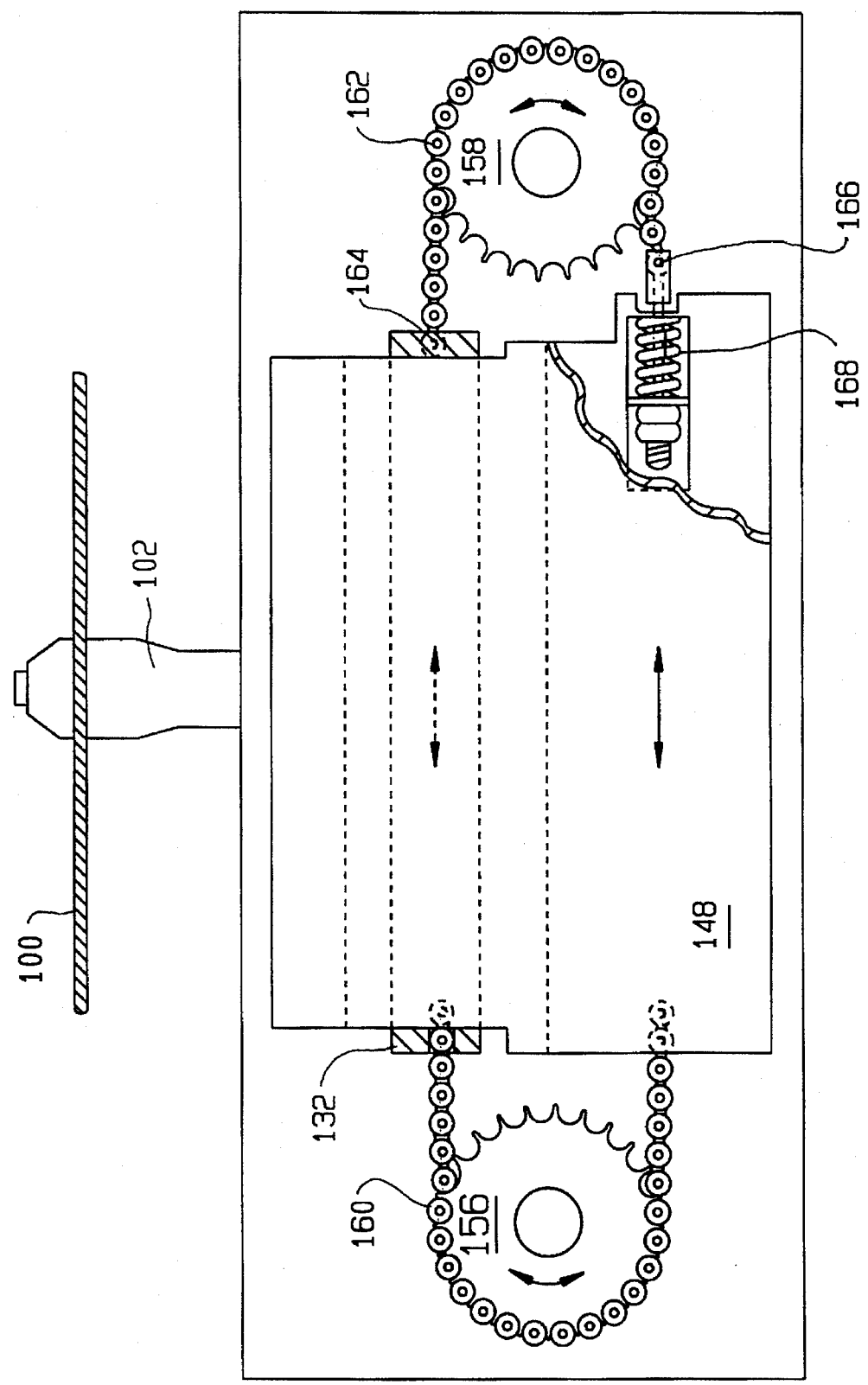
FIG. 5 is a bottom view of an alternative embodiment of the invention wherein chains and cogs are used instead of cables and pulleys.

FIG. 5 illustrates another alternative embodiment wherein cogs 156 and 158 are used instead of pulleys, and wherein chains 160 and 162 are used instead of cables. In this embodiment, chains 160 and 162 are attached to the yoke and counter balance using pins such as pin 164. Preload spring 168 is used as previously described. Chain 162 may be engaged to the spring by using block and pin 166 which is connected to nuts and washers as shown in FIG. 5.

While preferred embodiments of the invention have been described, the descriptions are merely illustrative and are not intended to limit the present invention. For example, it is to be understood that although the invention was described using an example of a cam-based oscillating spindle assembly, the invention is applicable to any oscillating mass arrangement where there is a need to decrease the amount of force exerted on an apparatus. Thus, one of ordinary skill will recognize that the invention is equally applicable to other oscillating spindle arrangements such as a leadscrew or linear motor systems, as well as to oscillating media arrangements such as oscillating magazine systems.

What is claimed is:

1. An apparatus for texturizing a disk, comprising:
    a frame;
    a spindle assembly including a rotatable spindle adapted to hold a disk for rotation, said spindle assembly mounted on the frame;
    a texturizing assembly mounted on the frame, said assembly configured and dimensioned to position a texturizing medium in contact with a disk held on and rotated by the spindle;
    means for creating relative translatory oscillation as between the spindle assembly and the texturizing assembly, wherein one of said assemblies is stationary with respect to the frame and the other of said assemblies translates in first and second opposite directions with respect to the frame;
    a counter-balance mounted on the frame for translational movement with respect to the frame, said counter-balance cooperating with said translating assembly to move in response to movement of said translating assembly in the direction opposite the direction of movement of the translating assembly; and
    a mechanical linkage adapted to impart translational movement to the counter-balance in response to the translational movement of the translating assembly wherein the mechanical linkage comprises two support elements mounted on the frame on opposite sides of the counter-balance and a flexible force transmitting element passing around each support element and attached at one end to said spindle assembly and at another end to said counter-balance, and wherein at least one end of one of said flexible force transmitting elements is secured to the counter-balance by a spring biased connection.

2. The apparatus according to claim 1, wherein said spring biased connection exerts a spring force greater than the force generated by movement of the translational assembly.

3. An apparatus for texturizing a disk, comprising:
    a frame;
    a rotatable spindle adapted to hold a disk for rotation, said spindle mounted on the frame for translational movement with respect to the frame;
    a motor cooperating with the spindle to impart translational movement to the spindle with respect to the frame;
    a counter-balance mounted on the frame for translational movement with respect to the frame, said counter-balance cooperating with said spindle to move in a direction opposite to the translational movement of the spindle with respect to the frame; and
    a mechanical linkage secured between the spindle and the counter-balance, adapted to impart translational movement to the counter-balance in response to translational movement of the spindle wherein the mechanical linkage comprises a cog and a chain connected to said spindle and said counter-balance.

4. An apparatus for texturizing a disk, comprising:
    a frame;
    a rotatable spindle adapted to hold a disk, said spindle mounted on the frame;
    a texturizing assembly mounted on the frame and configured and dimensioned to position a texturizing medium in contact with a disk held and rotated by the spindle, said assembly being mounted for translational oscillation with respect to the spindle;
    a counter-balance mounted on the frame for translational movement with respect to the frame, said counter-balance cooperating with said texturizing assembly to move in a direction opposite to the translational movement of said assembly with respect to the frame; and
    a mechanical linkage secured between the texturizing assembly and the counter-balance, adapted to impart translational movement to the counter-balance in response to translational movement of the texturizing assembly wherein the mechanical linkage comprises a pulley and a cable connected to said texturizing assembly and said counter-balance.

5. An apparatus for texturizing a disk, comprising:
    a frame;
    a rotatable spindle adapted to hold a disk, said spindle mounted on the frame;
    a texturizing assembly mounted on the frame and configured and dimensioned to position a texturizing medium in contact with a disk held and rotated by the spindle, said assembly being mounted for translational oscillation with respect to the spindle;
    a counter-balance mounted on the frame for translational movement with respect to the frame, said counter-balance cooperating with said texturizing assembly to move in a direction opposite to the translational movement of said assembly with respect to the frame; and a mechanical linkage secured between the texturizing assembly and the counter-balance, adapted to impart translational movement to the counter-balance in response to translational movement of the texturizing assembly wherein the mechanical linkage comprises a cog and a chain connected to said texturizing assembly and said counter-balance.

6. An apparatus for texturizing a disk, comprising:

a base member;

a rotatable spindle assembly including a spindle adapted to hold a disk for rotation and a motor to rotate the spindle, said spindle assembly mounted on the base member;

a texturizing assembly mounted on the base member, said assembly configured and dimensioned to position an abrasive texturizing medium in contact with the disk held on and rotated by the spindle wherein said texturizing assembly is mounted stationary with respect to the base member and said spindle assembly is mounted for translation, said spindle assembly having a total translating mass;

means for creating relative translatory oscillation as between the spindle assembly and the texturizing assembly, wherein one of said assemblies is stationary with respect to the base member and the other of said assemblies translates with respect to the base member;

a counter-balance mounted on the base member for translational movement with respect to the base member wherein the counter-balance has a mass substantially equal to the total translating mass of the spindle assembly; and a mechanical linkage secured between the counterbalance and said translating assembly, said linkage adapted to impart translational movement to the counter-balance in one direction in response to translational movement of the translating assembly in an opposite direction, wherein the mechanical linkage comprises:

two support elements mounted on the base member on opposite sides of the counter-balance; and a flexible force transmitting element passing around each support element, attached at one end to said spindle assembly and at the other end to said counter-balance wherein at least one of said attachments includes a spring biased connection exerting a spring force greater than the force generated by the motion of the spindle assembly total translating mass.

7. An apparatus for texturizing a disk, comprising:

a base member;

a rotatable spindle assembly including a spindle adapted to hold a disk for rotation and a motor to rotate the spindle, said spindle assembly mounted on the base member;

a texturizing assembly mounted on the base member, said assembly configured and dimensioned to position an abrasive texturizing medium in contact with the disk held on and rotated by the spindle;

means for creating relative translatory oscillation as between the spindle assembly and the texturizing assembly, wherein one of said assemblies is stationary with respect to the base member and the other of said assemblies translates with respect to the base member, and wherein said spindle assembly is mounted stationary with respect to the base member and said texturizing assembly is mounted for translation, said texturizing assembly having a total translating mass;

a counter-balance mounted on the base member for translational movement with respect to the base member wherein the counter-balance has a mass substantially equal to the total translating mass of the texturizing assembly; and a mechanical linkage secured between the counter-balance and said translating assembly, said linkage adapted to impart translational movement to the counter-balance in one direction in response to translational movement of the translating assembly in an opposite direction, wherein the mechanical linkage comprises:

two support elements mounted on the base member on opposite sides of the counter-balance; and a flexible force transmitting element passing around each support element, attached at one end to said texturizing assembly and at the other end to said counter-balance wherein at least one of said attachments includes a spring biased connection exerting a spring force greater than the force generated by the motion of the texturizing assembly total translating mass.

* * * * *